US 9,146,974 B2

(12) United States Patent
Arnold et al.

(10) Patent No.: US 9,146,974 B2
(45) Date of Patent: Sep. 29, 2015

(54) DYNAMIC OPTIMIZATION OF PREPARED STATEMENTS IN A STATEMENT POOL

(75) Inventors: Jeremy Alan Arnold, Rochester, MN (US); Eric Lawrence Barsness, Pine Island, MN (US); Richard Dean Dettinger, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2086 days.

(21) Appl. No.: 11/870,218

(22) Filed: Oct. 10, 2007

(65) Prior Publication Data

US 2008/0027999 A1   Jan. 31, 2008

Related U.S. Application Data

(62) Division of application No. 10/154,023, filed on May 23, 2002, now Pat. No. 7,356,523.

(51) Int. Cl.
*G06F 17/30* (2006.01)

(52) U.S. Cl.
CPC ...... *G06F 17/3056* (2013.01); *G06F 17/30442* (2013.01)

(58) Field of Classification Search
CPC .................. G06F 17/30442; G06F 17/30463
USPC ............................................. 707/999.02, 713
See application file for complete search history.

(56) References Cited

U.S. PATENT DOCUMENTS

| 5,668,987 | A | | 9/1997 | Schneider |
| 5,701,461 | A | | 12/1997 | Dalal et al. |
| 5,765,147 | A | | 6/1998 | Mattos et al. |
| 5,857,188 | A | | 1/1999 | Douglas |
| 5,875,334 | A | * | 2/1999 | Chow et al. ................ 717/141 |
| 5,940,845 | A | * | 8/1999 | Prager et al. ............... 715/210 |
| 5,956,706 | A | | 9/1999 | Carey et al. |
| 6,003,022 | A | * | 12/1999 | Eberhard et al. ................ 707/2 |
| 6,003,050 | A | | 12/1999 | Silver et al. |
| 6,044,442 | A | | 3/2000 | Jesionowski |
| 6,115,703 | A | * | 9/2000 | Bireley et al. ............. 707/704 |
| 6,134,540 | A | | 10/2000 | Carey et al. |
| 6,182,133 | B1 | | 1/2001 | Horvitz |
| 6,195,653 | B1 | | 2/2001 | Bleizeffer et al. |
| 6,199,063 | B1 | | 3/2001 | Colby et al. |

(Continued)

OTHER PUBLICATIONS

Oracle 8i Designing and Tuning for Performance, 2000, pp. 1-36.*

(Continued)

*Primary Examiner* — Cam-Y Truong
(74) *Attorney, Agent, or Firm* — Middleton Reutlinger

(57) ABSTRACT

An apparatus, program product and method dynamically optimize prepared statements resident in a statement pool to permit subsequent reuses of such statements to utilize the optimized representations of such statements. The optimization of pooled statements may be performed responsive to the tracked usage of the statements in a statement pool, to direct the overhead associated with such optimization to those statements that are more likely to be utilized in the future. Among a multitude of possible optimizations, a pooled statement that requests data in a format other than that utilized by the database being accessed may be modified to request the data in the format used by the database, thereby decreasing the overhead in the database associated with format conversions.

17 Claims, 3 Drawing Sheets

(56) References Cited

U.S. PATENT DOCUMENTS

| | | | |
|---|---|---|---|
| 6,233,578 B1 | 5/2001 | Machihara et al. | |
| 6,236,997 B1 | 5/2001 | Bodamer et al. | |
| 6,266,658 B1 | 7/2001 | Adya et al. | |
| 6,275,820 B1 | 8/2001 | Navin-Chandra et al. | |
| 6,282,537 B1* | 8/2001 | Madnick et al. | 707/716 |
| 6,363,371 B1 | 3/2002 | Chaudhuri et al. | |
| 6,366,901 B1 | 4/2002 | Ellis | |
| 6,370,522 B1 | 4/2002 | Agarwal et al. | |
| 6,411,951 B1 | 6/2002 | Galindo-Legaria et al. | |
| 6,438,537 B1 | 8/2002 | Netz et al. | |
| 6,496,843 B1 | 12/2002 | Getchius et al. | |
| 6,519,604 B1 | 2/2003 | Acharya et al. | |
| 6,529,901 B1 | 3/2003 | Chaudhuri et al. | |
| 6,546,382 B1 | 4/2003 | Amor et al. | |
| 6,553,461 B1 | 4/2003 | Gupta et al. | |
| 6,601,073 B1* | 7/2003 | Robare | 707/104.1 |
| 6,629,094 B1 | 9/2003 | Colby et al. | |
| 6,678,674 B1 | 1/2004 | Saeki | |
| 6,718,320 B1 | 4/2004 | Subramanian et al. | |
| 6,728,720 B1 | 4/2004 | Lenzie | |
| 6,732,360 B1 | 5/2004 | Seo et al. | |
| 6,772,411 B2* | 8/2004 | Hayes et al. | 717/127 |
| 6,795,817 B2 | 9/2004 | Agarwal et al. | |
| 6,795,826 B2 | 9/2004 | Flinn et al. | |
| 6,801,914 B2 | 10/2004 | Barga et al. | |
| 6,850,925 B2* | 2/2005 | Chaudhuri et al. | 1/1 |
| 6,879,990 B1 | 4/2005 | Boyer et al. | |
| 6,901,582 B1 | 5/2005 | Harrison | |
| 6,941,451 B2 | 9/2005 | Rudy et al. | |
| 7,058,622 B1 | 6/2006 | Tedesco | |
| 7,096,219 B1 | 8/2006 | Karch | |
| 7,127,463 B2 | 10/2006 | Arnold et al. | |
| 7,272,589 B1* | 9/2007 | Guay et al. | 707/2 |
| 7,356,523 B2 | 4/2008 | Arnold et al. | |
| 7,617,181 B2 | 11/2009 | Arnold et al. | |
| 7,653,620 B2 | 1/2010 | Arnold et al. | |
| 7,912,848 B2 | 3/2011 | Arnold et al. | |
| 2001/0029542 A1* | 10/2001 | Nishimura | 709/231 |
| 2002/0007384 A1* | 1/2002 | Ushioda et al. | 707/536 |
| 2002/0010706 A1* | 1/2002 | Brickell et al. | 707/200 |
| 2002/0091712 A1 | 7/2002 | Martin et al. | |
| 2003/0110153 A1 | 6/2003 | Shee | |
| 2003/0126232 A1 | 7/2003 | Mogul et al. | |
| 2004/0205062 A1 | 10/2004 | Brown et al. | |
| 2004/0205065 A1 | 10/2004 | Petras et al. | |
| 2005/0256884 A1 | 11/2005 | Arnold et al. | |
| 2007/0156726 A1 | 7/2007 | Levy | |
| 2007/0192352 A1 | 8/2007 | Levy | |
| 2010/0057796 A1* | 3/2010 | Brown et al. | 707/715 |

OTHER PUBLICATIONS

Bernstein et al., "Context-Based Prefetch for Implementing Objects on Relations," Proceedings of the 25th VLDB Conference Edinburgh, Scotland, 1999.

Palmer et al., "Fido: A cache that learns to fetch," Proceedings of the 17th International Conference on VLDB, Sep. 1991.

J. Heidebrecht, "developerWorks : Java™ Technology : What's new in JDBC 3.0", http://www-106.ibm.com/developerworks/library/j-jdbcnew/index.html, Jul. 25, 2001.

Hab, Kazimierz Subieta, Metamodel for Object-Oriented Database Management Systems, Nov. 2002.

U.S. Patent and Trademark Office, Office Action issued in related U.S. Appl. No. 10/124,845, dated Jun. 29, 2005.

U.S. Patent and Trademark Office, Office Action issued in related U.S. Appl. No. 10/124,845, dated Aug. 26, 2005.

U.S. Patent and Trademark Office, Final Office Action issued in related U.S. Appl. No. 10/124,845, dated Feb. 7, 2006.

U.S. Patent and Trademark Office, Notice of Allowance issued in related U.S. Appl. No. 10/124,845, dated May 26, 2006.

U.S. Patent and Trademark Office, Supplemental Notice of Allowance issued in related U.S. Appl. No. 10/124,845, dated Aug. 15, 2006.

US Patent and Trademark Office, Pre-Interview Communication issued in related U.S. Appl. No. 11/189,395 dated Feb. 26, 2009.

US Patent and Trademark Office, Office Action issued in related U.S. Appl. No. 11/189,395 dated May 6, 2009.

US Patent and Trademark Office, Final Office Action issued in related U.S. Appl. No. 11/189,395 dated Oct. 7, 2009.

US Patent and Trademark Office, Examiner's Answer to Appeal Brief issued in related U.S. Appl. No. 11/189,395 dated May 28, 2010.

US Patent and Trademark Office, Pre-Interview Communication issued in related U.S. Appl. No. 11/465,246 dated Sep. 30, 2008.

US Patent and Trademark Office, Office Action issued in related U.S. Appl. No. 11/465,246 dated Jan. 5, 2009.

US Patent and Trademark Office, Office Action issued in related U.S. Appl. No. 11/465,246 dated Mar. 9, 2009.

US Patent and Trademark Office, Notice of Allowance issued in related U.S. Appl. No. 11/465,246 dated Jun. 29, 2009.

US Patent and Trademark Office, Office Action issued in related U.S. Appl. No. 10/154,023 dated Mar. 24, 2005.

US Patent and Trademark Office, Office Action issued in related U.S. Appl. No. 10/154,023 dated Jul. 6, 2005.

US Patent and Trademark Office, Final Office Action issued in related U.S. Appl. No. 10/154,023 dated Dec. 29, 2005.

US Patent and Trademark Office, Notice of Allowance issued in related U.S. Appl. No. 10/154,023 dated Feb. 1, 2007.

US Patent and Trademark Office, Office Action issued in related U.S. Appl. No. 11/870,189 dated Aug. 13, 2008.

US Patent and Trademark Office, Office Action issued in related U.S. Appl. No. 11/870,189 dated Feb. 24, 2009.

US Patent and Trademark Office, Final Office Action issued in related U.S. Appl. No. 11/870,189 dated Aug. 21, 2009.

US Patent and Trademark Office, Notice of Allowance issued in related U.S. Appl. No. 11/870,189 dated Sep. 9, 2009.

US Patent and Trademark Office, Office Action issued in related U.S. Appl. No. 11/870,225 dated Sep. 16, 2009.

US Patent and Trademark Office, Final Office Action issued in related U.S. Appl. No. 11/870,218 dated Mar. 31, 2010.

US Patent and Trademark Office, Notice of Allowance issued in related U.S. Appl. No. 11/870,218 dated Nov. 16, 2010.

\* cited by examiner

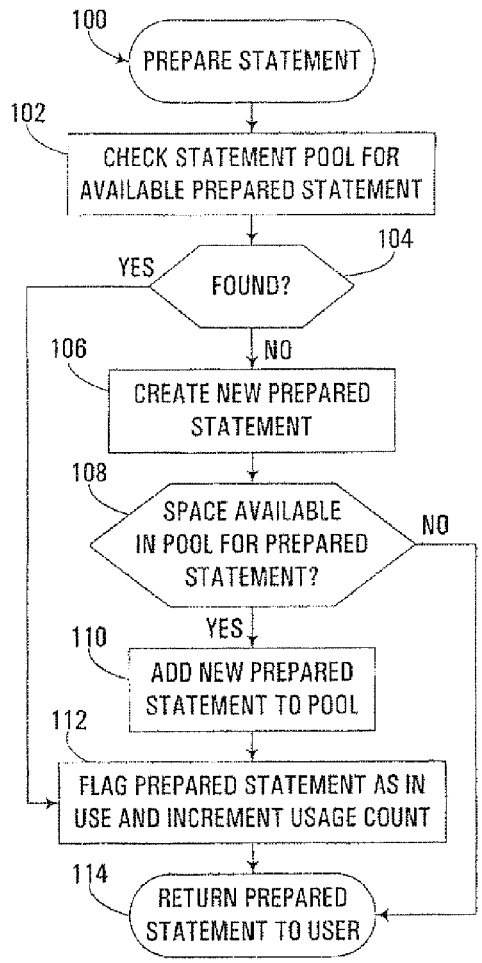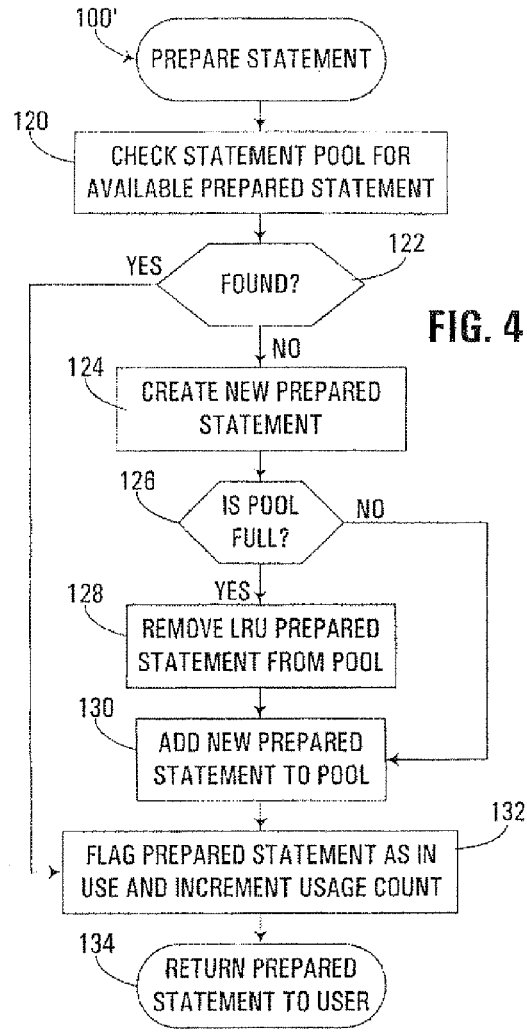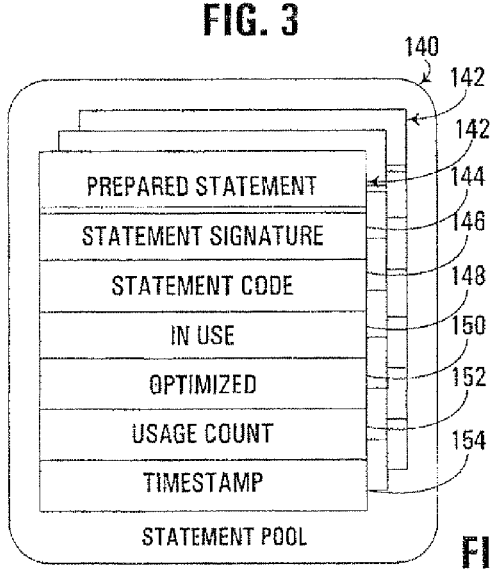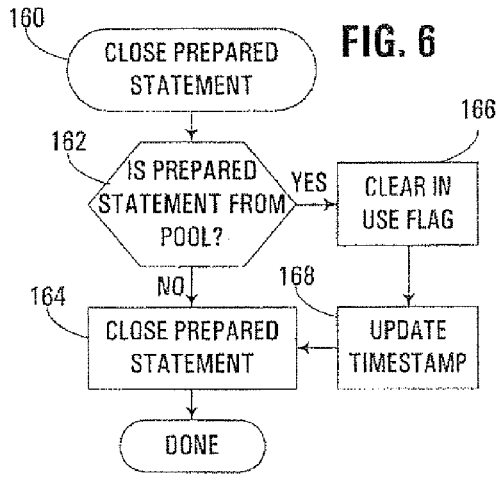

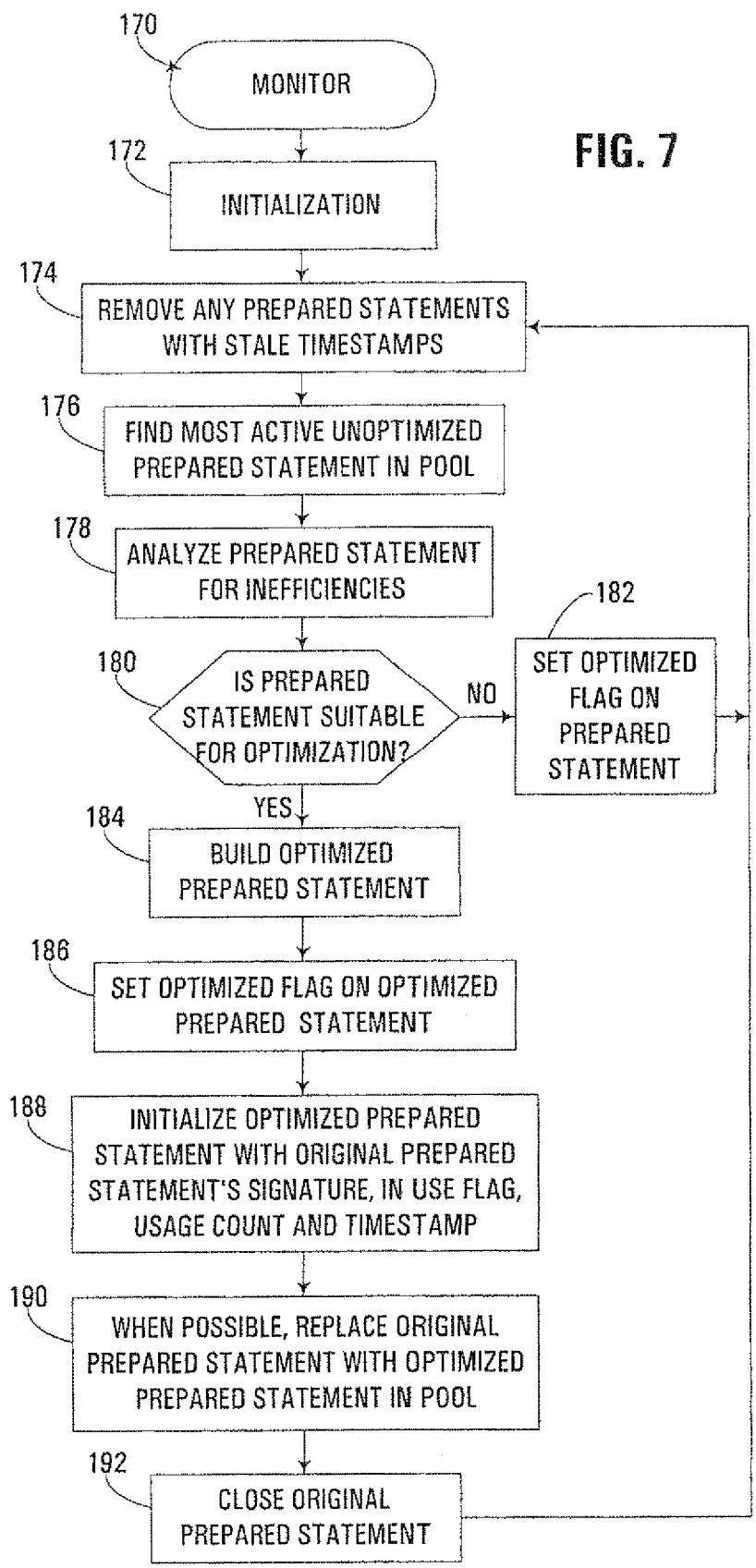

DYNAMIC OPTIMIZATION OF PREPARED STATEMENTS IN A STATEMENT POOL

CROSS-REFERENCE TO RELATED APPLICATIONS

This application is a divisional of U.S. patent application Ser. No. 10/154,023, filed May 23, 2002 now U.S. Pat. No. 7,356,523 by Arnold et al., which is incorporated by reference herein.

FIELD OF THE INVENTION

The invention relates to database management systems, and in particular, to statement pooling utilized therein.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query. In addition, a reduced reliance on runtime interpretation of queries in favor of increased usage of directly-executable program code has improved query engine performance.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

In many object-oriented database designs, for example, various active objects used by clients of a database may be shared and/or reused to reduce the overhead associated with individually creating those active objects each time they are needed.

Connection pooling, for example, refers to the reuse and sharing of "connections" to a database. When a connection is requested, a connection object, providing various methods used to interface with a database, is created. Creation of a connection object often requires authentication with the database as well as an allocation of resources in the database to handle the connection, both of which may consume a substantial amount of time and resources in the database.

With connection pooling, created connection objects are maintained in a "pool", so that, whenever a client wishes to open a connection, an existing connection object may be used in lieu of creating a new connection object, thus saving the overhead associated with creating the new connection object. In many environments it is desirable for clients to maintain an active connection with a database only when issuing requests on the database or performing updates to the database, so in such environments it is common for such clients to need to reconnect with a database on a relatively frequent basis. As a result, in such environments, connection pooling can provide substantial gains in database performance.

Related to the concept of connection pooling is statement pooling, which reuses prepared statements utilized in concert with requests made upon a database. Specifically, many database designs incorporate a prepare/execute data access model to process SQL queries. During a "prepare" operation, an access plan (often referred to as a prepared statement), is prepared for an SQL statement by the database. Then, during an "execute" operation, that access plan is executed with specific parameters to perform the desired query.

Generating a prepared statement for an SQL query often occupies much of the overhead associated with processing the query. Thus, by separating the preparation and execution of a query into separate operations, a prepared statement can be stored in a pool and reused by multiple queries, with later queries having basically the same SQL statement format as the original query merely providing new parameters to the prepared statement. Overall performance is therefore improved due to the elimination of many of the statement preparation operations that would otherwise be required to execute individual queries.

The benefits of statement pooling to both client throughput and database scalability can be substantial; however, one drawback of many statement pooling schemes results from the often non-optimal configuration of the various prepared statements in a statement pool. In many instances, prepared statements are generated from SQL statements initiated by automated tools that may not be capable of generating an optimal SQL statement format. Particularly given that the optimal configuration of an SQL query can vary from platform to platform, and from database to database, based upon different performance characteristic of the underlying platform and/or database, generic tools that generate SQL statements suitable for multiple platforms and/or databases likely are incapable of generating the optimal SQL statement for a particular situation. Moreover, even when SQL statements are initially created by application programmers, attempting to support multiple platforms and/or databases in a given application can often clutter up application code, and hamper the overall application development process. In still other instances, application programmers may simply not be aware of the optimal SQL statement format for a particular situation. As a result, the prepared statements resident in a statement pool often fall short of being optimally configured to efficiently implement a particular query on a particular platform and/or database.

Automated optimization of database queries has in general been performed at various stages in the life of a query, including during generation of prepared statements from SQL statements by a query optimizer, and during execution of prepared statements by a query engine. Irrespective of these various optimizations, however, it has been found that many prepared statements in a statement pool are often non-optimal in nature, simply based upon the fact that the optimizations may be performed on initially non-optimal SQL statements issued by an application program. As a result, the inefficiencies embodied in these non-optimal pooled statements are compounded as those statements are repeatedly reused.

An additional concern in many systems results from the resource-intensive nature of various types of optimizations. A goal of any optimization is for the additional overhead associated with performing an optimization to not exceed the overhead savings obtained by the use of an optimized representation of a query instead of an unoptimized representation of the same. Thus, in many instances, particularly where it is not known that particular queries will eventually be reused, optimization of such queries may not always be prudent.

Therefore, a significant need continues to exist for a manner of optimizing queries so as to maximize the relative benefits of optimization over the additional costs associated with the implementation of such optimizations.

SUMMARY OF THE INVENTION

The invention addresses these and other problems associated with the prior art by providing an apparatus, program product and method in which prepared statements resident in a statement pool are dynamically optimized to permit subsequent reuses of such statements to utilize the optimized representations of such statements. Among other benefits, by optimizing a statement in a statement pool, database performance is often improved even beyond the improvements resulting from statement pooling, as potentially inefficient prepared statements may be replaced by more efficient, optimized statements that are desirably reused numerous times as a result of statement pooling. The performance gains may often positively affect a client application in terms of increased throughput, as well as a server and/or database in terms of increased system scalability. Moreover, optimizing statements in a statement pool often permits optimizations to be performed outside of the scope of a client application, e.g., within a database server or driver interface program code. Thus, continuing compatibility with client applications is typically ensured without requiring any modifications to the client applications.

In some embodiments consistent with the invention, optimization of pooled statements may be performed responsive to the tracked usage of the statements in a statement pool. Given the limited resources to which many database management systems may have access, it is often desirable to minimize the overhead penalty associated with optimization of pooled statements. Consequently, prioritizing optimization resources toward those statements that are used more frequently increases the likelihood that optimizations will have a positive effect on overall performance.

Moreover, in some embodiments consistent with the invention, one type of optimization that may be performed with respect to a pooled statement is that of modifying a statement, which originally requests data in a format other than that utilized by the database being accessed, to instruct the database to convert the data to an appropriate format prior to returning the data.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 3 is a flowchart illustrating the program flow of a prepare statement routine executed by the database driver in response to the prepare statement request illustrated in FIG. 2.

FIG. 4 is a flowchart illustrating the program flow of an alternate prepare statement routine to that illustrated in FIG. 3.

FIG. 5 is a block diagram of an exemplary statement pool utilized by the prepare statement routines of FIGS. 3 and 4.

FIG. 6 is a flowchart illustrating the program flow of a close prepared statement routine executed by the database driver of FIG. 1.

FIG. 7 is a flowchart illustrating the program flow of a monitor routine executed by the database driver of FIG. 1.

DETAILED DESCRIPTION

Figure 1:
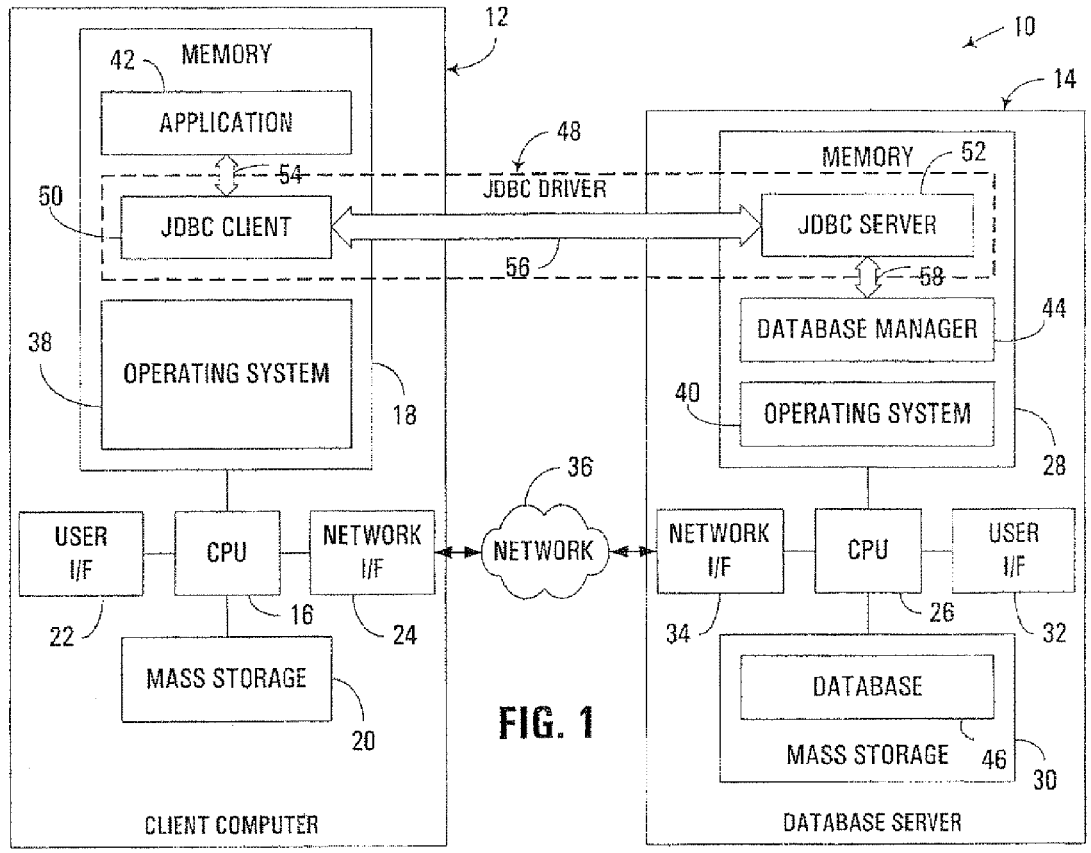
FIG. 1 is a block diagram of a client-server computer system incorporating a database management system consistent with the invention.

The embodiments discussed hereinafter implement dynamic optimization of prepared statements in a statement pool to optimize the execution of such prepared statements. The dynamic optimization typically occurs in a background process, and outside of the scope of a client application, thus permitting many client applications to reap the benefits of such dynamic optimization without any special configuration or adaptation. Moreover, by maintaining such optimization beyond the scope of a client application, it may also be possible to optimize platform- or database-independent prepared statements for specific use in connection with a particular platform and/or database, thus improving the portability of the application code.

Practically any optimization that may be implemented in connection with database queries may be applied to pooled statements consistent with the invention. One specific optimization described hereinafter, for example, attempts to modify the manner in which character strings in a database are accessed. The JDBC API, for example, utilizes only Unicode character strings, while in many instances character data is not stored in a database in Unicode format. Conventional JDBC drivers often have a significant overhead associated with taking data in a specific encoding and translating it to Unicode. As such, one potential optimization is to modify an SQL statement in a statement pool to instruct the database to handle these conversions directly, thus permitting the conversions to occur much closer to the hardware, and thus be performed more efficiently.

Other data conversions to optimized formats may also be performed, e.g., to cast other data types within the database system instead of forcing that work to happen at higher level API's. As an example, the type cast of packed numeric formats to INT or BIG INT formats may be more efficient at the database level. In addition, more efficient handling of the conversion of NUMERIC and DECIMAL fields with a scale of zero into base data types may be performed at the API level, as many API's, such as the JDBC API, are much faster dealing with primitive types directly, and many database systems are comparatively efficient at converting from these types into primitive types.

Additional optimizations may include the optimization of complex prepared statements into multiple stored procedures, thus taking advantage of the faster performance of SQL in stored procedures over dynamic SQL.

Still other optimizations may be associated with database modification. For example, analysis of a query access plan might show that a temporary index is generated or that a query would benefit from the generation of such an index. Once such information is known, appropriate optimizations could be performed so that future executions of the query can take advantage of such optimizations.

Another potential optimization result is associated with query rearrangement. In particular, often the data for a query can be returned in any order. However, on many platforms, data is easiest to retrieve in its defined order in the database. Queries may therefore be optimized and re-executed with a desirable order, with the access method providing a small mapping layer for user fetch requests.

Yet another potential optimization result is associated with data usage analysis. For example, it is not uncommon for all data (including numbers) from a query to be fetched as character data, e.g., for the purposes of report generation or web page building. Thus, by analyzing how a data is fetched from a database, a query might be modified so all data is turned into strings at the database level, rather than requiring such conversion to be performed at the API or application level.

Another optimization that could be performed relates to platform or database specifics. In particular, a client application that issues platform-independent SQL statements (or statements optimized for other platforms or databases) could be effectively optimized on the fly to operate with a particular database or platform simply through the dynamic optimizations of the statements that are issued by that application.

An additional optimization that may be performed may relate to minimizing network traffic between a client and a server, e.g., utilizing the principles outlined in the aforementioned related application.

In general, practically any optimization that might be applied to a database query may be implemented in connection with the herein-described embodiments.

In some embodiments consistent with the invention, the optimization of prepared statements is prioritized based upon tracked usage of prepared statements, so that the limited system resources available for implementing optimizations may be desirably allocated to optimizing those statements that are the most likely to be reused in the future. Pooling statistics and metadata, for example, may be used to determine whether to dynamically optimize prepared statements. As an example, one or both of a tracked usage count and a timestamp may be used to identify hot statements in a statement pool, and such statements may be analyzed for various inefficiencies that can be corrected at the SQL statement level by analyzing collected metadata about the SQL statement results. If it is determined that a particular statement is a good candidate for modification, that statement text may be changed and re-prepared and placed into the pool in place of the less efficient version. Moreover, the less-efficient version may simply be thrown out. As will become more apparent below, it may also be desirable to utilize pooling statistics to remove lesser-used prepared statements to maintain space in a pool for optimized statements.

Practically any type of metadata that is relevant to the efficiency of a prepared statement may be utilized to determine potential optimizations that may be performed on a particular prepared statement. Moreover, other types of pooling statistics, e.g., the number of connections and/or users that access a pooled statement (in applications where pooled statements may be shared by multiple users and/or connections), etc., may also be relied upon in tracking usage of a pooled statement. Other modifications will be apparent to one of ordinary skill in the art having the benefit of the instant disclosure.

Turning now to the Drawings, wherein like numbers denote like parts throughout the several views, FIG. 1 illustrates a client-server based database environment 10 consistent with the invention. System 10 includes at least one apparatus, e.g., one or more client computers 12 and one or more server computers 14. For the purposes of the invention, each computer 12, 14 may represent practically any type of computer, computer system or other programmable electronic device capable of respectively functioning as a client or server in a client-server environment. Moreover, each computer 12, 14 may be implemented using one or more networked computers, e.g., in a cluster or other distributed computing system. Moreover, as is common in many client-server systems, typically multiple client computers 12 will be interfaced with a given server computer 14.

Computer 12 typically includes a central processing unit 16 including at least one microprocessor 12 coupled to a memory 18, which may represent the random access memory (RAM) devices comprising the main storage of computer 12, as well as any supplemental levels of memory, e.g., cache memories, non-volatile or backup memories (e.g., programmable or flash memories), read-only memories, etc. In addition, memory 18 may be considered to include memory storage physically located elsewhere in computer 12, e.g., any cache memory in a processor in CPU 16, as well as any storage capacity used as a virtual memory, e.g., as stored on a mass storage device 20 or on another computer coupled to computer 12. Computer 12 also typically receives a number of inputs and outputs for communicating information externally. For interface with a user or operator, computer 12 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 12 may also include one or more mass storage devices 20, e.g., a floppy or other removable disk drive, a hard disk drive, a direct access storage device (DASD), an optical drive (e.g., a CD drive, a DVD drive, etc.), and/or a tape drive, among others. Furthermore, computer 12 may include an interface 24 with one or more networks (e.g., a LAN, a WAN, a wireless network, and/or the Internet, among others) to permit the communication of information with other computers and electronic devices. It should be appreciated that computer 12 typically includes suitable analog and/or digital interfaces between CPU 16 and each of components 18, 20, 22 and 24 as is well known in the art.

In a similar manner to computer 12, computer 14 includes a CPU 26, memory 28, mass storage 30, user interface 32 and network interface 34. However, given the nature of computers 12 and 14 as client and server, in many instances computer 14 will be implemented using a multi-user computer such as a server computer, a midrange computer, a mainframe, etc., while computer 12 will be implemented using a desktop or other single-user computer. As a result, the specifications of the CPU's, memories, mass storage, user interfaces and network interfaces will typically vary between computers 12 and 14. Other hardware environments are contemplated within the context of the invention.

Computers 12, 14 are generally interfaced with one another via a network 36, which may be public and/or private, wired and/or wireless, local and/or wide-area, etc. Moreover, network 36 may represent multiple, interconnected networks.

Each computer 12, 14 operates under the control of an operating system 38, 40, and executes or otherwise relies upon various computer software applications, components, programs, objects, modules, data structures, etc. Moreover, various applications, components, programs, objects, modules, etc. may also execute on one or more processors in another computer coupled to computer 12, 14 via a network 18, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Embodiments consistent with the invention are configured to utilize statement pooling in connection with the performance of database queries. Statement pooling is typically utilized in concert with connection pooling, although statement pooling may be used separate from any connection pooling. Moreover, as will become more apparent below, a statement pool may be scoped to a single connection from a connection pool, whereby only clients that utilize a given connection will reuse statements from a statement pool associated with that connection. In other embodiments, however, statement pools may be shared by multiple connections, multiple clients, multiple client threads, etc., and thus may not be associated with any particular connection.

In the illustrated embodiments, statement pooling is implemented within the server side of a client-server database driver. In the context of the invention, a client may generally be considered to include any program code resident on a computer or other programmable electronic device that is capable of making requests of another computer in a distributed computer system. Likewise, a server may generally be considered to include any program code resident on a computer or other programmable electronic device that is capable of servicing such requests in a distributed computer system. It should also be appreciated that a server in this context may be resident on the same computer as the actual database being accessed by a client, or in the alternative, the server may be resident on an intermediate computer coupled between the client(s) and the actual database.

For example, as shown in FIG. 1, client computer 12 has resident within memory 18 one or more client applications 42 that function as users or clients of a database manager 44 resident in memory 28 of server computer 14. Database manager 44 handles the server-side access of a database 46, shown resident in mass storage 30.

A database driver 48 has a client-side portion 50 and a server-side portion 52 that communicate with one another to seamlessly interface client applications 42 with database manager 44. As is well known in the art, client-side portion 50 includes an Application Programming Interface (API) supporting a set of functions available to the applications, as represented by arrow 54. In addition, client-side portion 50 is interfaced with server-side portion 52 through a set of functions specific to those components, as represented by arrow 56. Moreover, server-side portion 52 accesses database manager 44 through a set of functions made available by the database manager, as represented by arrow 58. Thus, as shown in FIG. 1, access to database 46 by a client application 42 typically occurs through a series of interactions between the client application, the client-side and server-side portions 50, 52 of driver 48 and database manager 44.

In the illustrated embodiment, database driver 48 is implemented as a Java Database Connectivity (JDBC) driver, the use and configuration of which is well known in the art. Database manager 44 may be implemented using practically any database management system capable of interfacing with JDBC drivers.

However, it will be appreciated that other database driver implementations may be used in the alternative. Moreover, as will become more apparent below, the functionality allocated to the database driver portions (e.g., which portion performs statement and/or connection pooling, monitoring and optimization of pooled statements, usage tracking of pooled statements, etc.), and the functionality allocated to the client application and database manager, may vary in different applications. Moreover, a database driver may be implemented solely within a client or server computer, and in some implementations, no driver interface may be used. Some databases, for example, support network connections, whereby all of the functionality described herein may be implemented in a client-side database driver.

Furthermore, in still other embodiments, both the client and server may reside in the same physical electronic device, or an access model other than a client-server access model may be used. Therefore, the invention is not limited to the particular implementation discussed herein.

Figure 2:
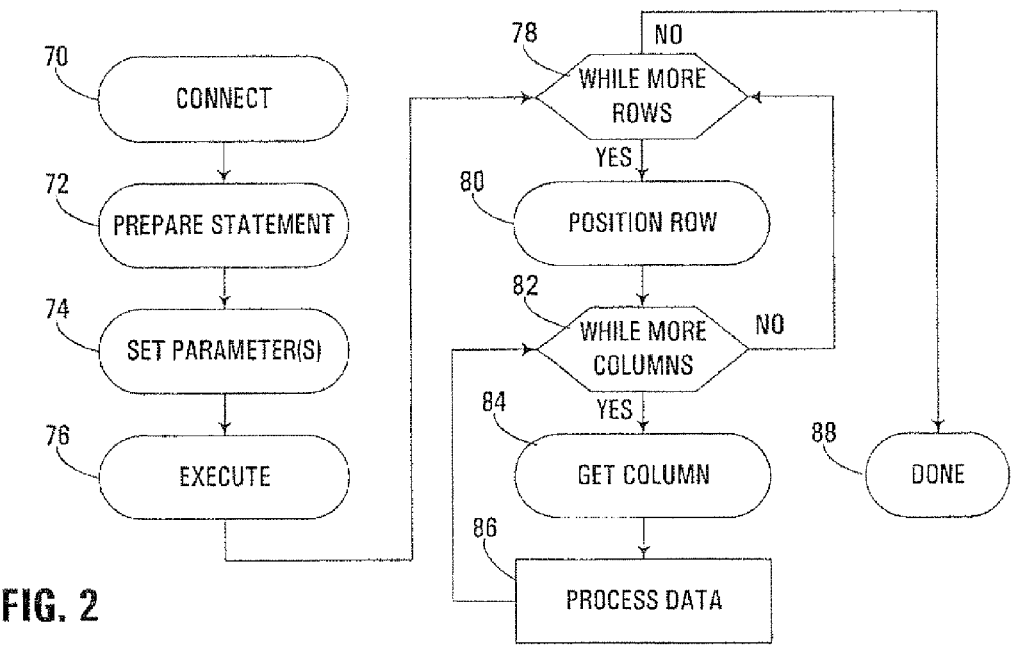
FIG. 2 is a block diagram illustrating the principal steps occurring during execution of a database query in the computer system of FIG. 1.

FIG. 2 next illustrates from the perspective of a client application the typical steps that occur during execution of a database query in computer system 10. It is assumed for the purposes of the illustrated embodiment that a relational database is being accessed using database queries taking the form of SQL-compatible statements. Moreover, a two-phase prepare and execute process is utilized to process SQL statements.

Initially, as represented in block 50, a client application initiates a database query by requesting to connect to the database server. For the purposes of the illustrated embodiment, it is assumed that connection pooling is used, whereby the request to connect to the database server is typically handled by assigning an unused connection from a connection pool to the client application. Then, as illustrated in block 72, a "prepare statement" operation is performed to prepare a prepared statement object for accessing the database. Next, as shown in block 74, one or more parameters are provided to the prepared statement object to format the object for performing a specific query.

Next, as illustrated in block 76, the statement is executed, thereby initiating on the server the generation of a result set corresponding to the database query. In addition, as is well known in the art, at this time the server may return as prefetch data a first block of data from the result set. Once the statement has been executed by the database, the client application next processes the data, typically by retrieving the desired columns of data from the rows matching the database query. As shown in FIG. 2, for example, two nested loops initiated at block 78 sequentially process each row and column within that row. Specifically, block 78 determines whether more unprocessed rows remain to be processed from the result set. If so, control passes to block 80 to perform a position row operation.

The position row operation essentially positions a pointer to a new row in the result set, and functions much as a "get next record" request in a non-relational database. Then, once a new record has been obtained via the position row request, a loop is initiated in block 82 to process each desired column of data from the current row. Thus, block 84 initiates a retrieval of a value from the result set in the form of a get column operation. In addition, as shown in block 86, the retrieved data may also be processed at this time as is desired for the client application. Control then returns to block 82, where additional columns are processed for the current row. Once all columns have been processed, block 82 returns control to block 78 to process additional rows from the result set. Once all rows have been processed, block 78 completes execution of the statement, as represented at block 88.

It will be appreciated that other statement processing operations may be utilized in other environments. The invention is therefore not limited to the particular interaction discussed in connection with FIG. 2.

FIG. 3 next illustrates a prepare statement routine 100 that is called, for example, in response to the generation of the prepare statement request as illustrated in block 72 of FIG. 2. Routine 100 begins in block 102 by checking a statement pool for an available prepared statement. Assuming initially that no prepared statement has a statement signature matching that requested by a client application, block 104 passes control to block 106 to create a new prepared statement. Creation of a new prepared statement typically incorporates the generation of an access plan for the statement supplied by the application, and typically involves an access to the database to request that the database prepare the access plan and ready the database to handle queries based upon that statement.

Next, block 108 determines whether space is available in the statement pool for the new prepared statement. Initially assuming that sufficient space is available in the pool, control passes to block 110 to add the new prepared statement to the pool. The prepared statement is then flagged as being "in use" and a usage count for the prepared statement is incremented to note that the prepared statement has now been used (block 112). Control then passes to block 114 to return a reference to the prepared statement to the client application (user). Preparation of the prepared statement is then complete.

Returning to block 104, if the request to prepare a statement identifies an existing prepared statement in the statement pool, block 104 bypasses blocks 106-110, and passes control directly to block 112 to flag the prepared statement as being "in use" and to increment the usage count for that statement. As such, the overhead associated with creating a new prepared statement is avoided when a like statement is identified in the statement pool. It should be appreciated that identifying a prepared statement matching a statement requested by a client application is well understood in the art.

Returning now to block 108, if it is determined that no space is available in the pool for a new prepared statement, routine 100 passes control directly to block 114 to return the prepared statement to the user, but without adding the new prepared statement to the pool. However, it should be appreciated that in other embodiments, it may be desirable to perform other pool management operations to manage the set of prepared statements that are resident in a pool at any given time.

For example, as illustrated by routine 100' of FIG. 4, a prepare statement operation may be processed by checking the statement pool for an available prepared statement in block 120, determining whether such a prepared statement was found in block 122, and creating a new prepared statement in block 124 if no such existing statement has been found. However, rather than determining whether space is available in the pool, as with routine 100, routine 100' may in block 126, determine whether the pool is full, and if so, pass control to block 128 to remove a least recently used prepared statement from the pool, prior to adding the new prepared statement to the pool in block 130. Of course, in block 126, if it is determined that the pool is not full, control may pass directly to block 130 to add the new statement to the pool. As with routine 100, routine 100' also, in block 132, flags a prepared statement as "in use" and increments a usage count after the new statement has been added to the pool. A reference to the prepared statement is then returned to the user or client application in block 134. Moreover, if an existing prepared statement is found in block 120, block 122 passes control to block 132 to bypass the creation of a new prepared statement.

A determination of a least recently used prepared statement to be removed from a statement pool may be based, for example, upon a time stamp associated with each prepared statement. In the alternative, a prepared statement may be removed based upon its infrequency of use, e.g., based upon a usage count or a usage frequency. Still other factors, e.g., the number of users and/or connections that rely upon a prepared statement may also be used in some embodiments.

Prepared statements may be represented in a statement pool using any number of data structures. For example, FIG. 5 illustrates an exemplary statement pool 140 including a plurality of prepared statement objects 142. Each prepared statement object 142 includes a statement signature 144, which is utilized to find prepared statements matching a particular statement issued by a user application. The statement signature may incorporate the entire unoptimized statement, or any other information suitable for identifying a statement format that might match a new statement issued by a user application.

Each object 142 also includes the optimized statement code 146, representing the actual code for the prepared statement. For use in connection with statement pool optimization, each prepared statement object 142 also includes a number of additional fields 148, 150, 152 and 154 to assist in the management of an optimized statement pool.

Field 148 stores an in use flag that identifies whether the statement is currently in use. This flag thus operates as a lock for the prepared statement.

Field 150 stores an optimized flag that identifies whether the statement code in the prepared statement has been optimized. The optimized flag is used to prevent attempts to optimize a statement that has already been optimized, or that cannot be optimized.

Field 152 stores a usage count, representing the number of times the prepared statement has been used. The usage count is utilized to rank unoptimized prepared statements so that optimization occurs in a descending order of usage counts, and thus directs the optimization efforts toward the most used statements.

Field 154 stores a time stamp, representing the last time the statement was used. The time stamp is used typically to determine whether a statement should be removed from the pool, so that room in the pool may be periodically freed if statements have not been used in a particular amount of time.

It may be desirable to additionally maintain a signature for the optimized version of a prepared statement in each object 142. However, since it is typically desirable to not change the interaction of the client application with the statement pool, it is typically desirable to maintain the signature of an unoptimized statement to facilitate location of matching statements irrespective of whether those statements have been optimized.

It will be appreciated that other data may be stored in each object 142, e.g., the parameters utilized by the statement and set by a user application each time the statement is executed. Moreover, alternate data may be stored in a prepared statement object to manage an optimized statement pool, and furthermore, other data structures may be utilized to represent each prepared statement consistent with the invention. Therefore, the invention is not limited to the particular statement pool configuration illustrated in FIG. 5.

FIG. 6 next illustrates a close prepared statement routine 160, utilized to discontinue use of a prepared statement. Routine 160 simply determines at block 162 whether the prepared statement being closed is from the pool. If not, the prepared statement is closed in block 164, in a manner generally known in the art. On the other hand, if the prepared statement is from the pool, the in use flag is cleared in block 166, and the time stamp for the prepared statement is updated in block 168, thus ensuring that the last usage of the statement has been updated.

Once the time stamp has been updated, control then passes to block 164 to close the prepared statement in a manner known in the art.

Optimization of prepared statements in the environment discussed above may take any number of forms. For example, as shown in FIG. 7, a background process such as a monitor routine 170 may be used to periodically optimize prepared statements based upon descending orders of usage. In other embodiments, however, optimization may be performed in various orders, including sequentially, based upon length of residency in the statement pool, etc. Moreover, optimization need not occur in a background process, but may be periodically invoked in connection with various maintenance operations. However, in many database environments, it is desirable to minimize the impact on accessibility to the database, the use of a background process, running concurrently with user accesses to the database, is often desired.

Monitor routine 170 may be associated with a given statement pool, or may also operate in connection with multiple statement pools. As such, where monitor routines are applied to specific statement pools, multiple monitor routines may be executing at any given time in a database environment.

Monitor routine 170 is generally invoked upon creation of the statement pool. Routine 170 begins in block 172 by performing various initialization steps as will be apparent to one of ordinary skill in the art having the benefit of the instant disclosure.

After initialization, control passes to block 174 to initiate a loop that continuously optimizes prepared statements in a desired order. It should be appreciated that the monitor process may occur continuously, and be granted slices of time by an operating system, or in the alternative, the monitor process may be configured to execute at predetermined intervals. Other manners of allocating resources for a background process such as monitor routine 170 are well known in the art.

Block 174 initially attempts to remove any prepared statements having stale time stamps, i.e., any prepared statements having time stamps that are older than a specific point in time. In the alternative, removal of prepared statements may be performed in connection with the creation of new prepared statements, as illustrated in FIG. 4. As such, block 174 is optional.

Next, in block 176, the usage counts and optimized flags of the various prepared statements in a statement pool are accessed to determine the most active unoptimized prepared statement in the pool. Next, block 178 analyzes that prepared statement for inefficiencies, and based upon such analysis, block 180 determines whether the prepared statement is suitable for optimization. If not, control passes to block 182 to set the optimized flag on the prepared statement so that the prepared statement will not be re-analyzed by the monitor routine. Control then returns to block 174 to attempt to optimize other prepared statements in the pool. Otherwise, block 180 passes control to block 184 to construct an optimized prepared statement. Next, once the optimized prepared statement has been constructed, block 186 sets the optimized flag on the optimized prepared statement, and block 188 initializes the optimized prepared statement to include the signature, in use flag, usage count and time stamp of the original prepared statement. Block 190 then replaces the original prepared statement with the optimized prepared statement in the statement pool. It should also be appreciated that the replacement operation may need to be deferred to an appropriate time, e.g., until once the in use flag for the original prepared statement indicates that the prepared statement is no longer in use. Thus, upon closing of an active prepared statement, the original prepared statement may be replaced with the optimized prepared statement in the pool.

Next, block 192 closes the original prepared statement, and control returns to block 174 to attempt to optimize other prepared statements in the pool.

It will be appreciated that the analysis of a prepared statement for inefficiencies in block 178, the determination of whether a prepared statement in suitable for optimization in block 180, and the construction of an optimized prepared statement in block 184 may take any number of configurations based upon the particular optimizations capable of being implemented by the monitor routine. As discussed above, a wide variety of potential optimizations may be performed, and in connection with such optimizations, any number of different types of metadata may be analyzed to determine whether a prepared statement is suitable for optimization. It will be appreciated that, in general, optimization of queries at various stages in the lifetimes of the queries is known in the art, and as such, practically any optimization that may be applied to a database query may be implemented within monitor routine 170 consistent with the invention. Moreover, the implementation of such optimizations and analysis operations would be well within the ability of one of ordinary skill in the art having the benefit of the instant disclosure.

As an example of the potential performance benefits obtained through dynamic optimization of prepared statements in a statement pool, a prototype was constructed in which a statement pool was created with a single statement taking the general form:

select SPECIFIC_SCHEMA, SPECIFIC_NAME,
        PARAMETER_NAME, DATA_TYPE
        from qsys2.sysparms It is assumed for the purposes of this prototype that the Java JDBC API (e.g., Version 3.0 or earlier) is utilized, which as described above, relies upon Unicode strings, which differs from many databases, which tend to store character data in other formats. The aforementioned select statement would typically require a JDBC driver to translate character data received from a database to Unicode before forwarding the data to a client application. However, assuming that such a conversion may be performed by a database with much less overhead, it may be desirable to modify the SQL statement to force the database to handle the conversions directly. As such, it may be desirable to optimize the aforementioned select statement to the following format:

select vargraphic(SPECIFIC_SCHEMA, 128, 13488),
        vargraphic(SPECIFIC_NAME, 128, 13488),
        vargraphic(PARAMETER_NAME, 18, 13488),
        vargraphic(DATA_TYPE, 18, 13488)
        from qsys2.sysparms In developing a monitor routine to optimize a statement such as shown above, the monitor routine may be configured to identify statements that select character data, and then optimize such statements to force Unicode conversion of all returned character data by the database.

Tests were run on the prototype, with the former statement issued 100 times. When optimization was performed after a few executions of the statement, the elapsed time to execute the statement 100 times was only about 57% of the execution time with no optimization performed. Certainly, where the number of executions was substantially greater, e.g., on the order of several hundred thousand or millions of executions, it may be seen that the performance gains would be substantial.

Various modifications may be made to the illustrated embodiments without departing from the spirit and scope of the invention. Therefore, the invention lies in the claims hereinafter appended.

What is claimed is:

1. A computer implemented method of managing a statement pool, the method comprising:
    tracking usage of a plurality of statements in a statement pool utilized by a database;
    selectively optimizing at least one of the statements from the statement pool based upon the tracked usage of the plurality of statements using at least one processor;
    after selectively optimizing the statement, processing a request to access an unoptimized representation of the statement by accessing an optimized representation of the statement; and
    executing a database query on the database using the optimized representation of the statement.

2. The method of claim 1, wherein tracking usage includes tracking at least one of a number of times and a last time that each of the statements is used.

3. The method of claim 1, further comprising selectively optimizing a second statement from the statement pool after selectively optimizing a first statement based upon the tracked usage indicating that the first statement has a higher usage than the second statement.

4. The method of claim 1, wherein selectively optimizing the statement further includes associating with an optimized representation of the statement a statement signature for an unoptimized representation of the statement, the method further comprising accessing the optimized representation of the statement in response to a user request to access a statement having a statement signature corresponding to the unoptimized representation of the statement.

5. The method of claim 1, wherein selectively optimizing the statement includes modifying an unoptimized representation of the statement to perform at least one of instructing the database to convert returned data to a different format prior to returning the data, modifying an access method to be used during execution of the statement, reordering a retrieval order for the data to be returned in response to execution of the statement, and referencing at least one stored procedure.

6. The method of claim 5, wherein selectively optimizing the statement further includes determining that the unoptimized representation of the statement requests data in a first format from a field in the database that stores the data in a second format, wherein modifying the unoptimized representation of the statement includes modifying the unoptimized representation of the statement to instruct the database to convert the data to the first format prior to returning the data.

7. The method of claim 6, wherein the unoptimized statement is processed by a Java Database Connectivity driver and requests the data in Unicode format, and wherein modifying the unoptimized representation of the statement includes modifying the unoptimized representation of the statement to instruct the database to convert the data to the Unicode format prior to returning the data.

8. An apparatus, comprising:
    a processor; and
    program code configured to be executed by the processor to manage a statement pool utilized by a database by tracking usage of a plurality of statements in the statement pool and selectively optimizing at least one of the statements from the statement pool based upon the tracked usage of the plurality of statements, wherein the program code is further configured to, after selectively optimizing the statement, process a request to access an unoptimized representation of the statement by accessing an optimized representation of the statement, and wherein the program code is further configured to execute a database query on the database using the optimized representation of the statement.

9. The apparatus of claim 8, wherein the program code is configured to track usage by tracking at least one of a number of times and a last time that each of the plurality of statements is used.

10. The apparatus of claim 8, wherein the program code is further configured to selectively optimize a second statement from the statement pool after selectively optimizing a first statement based upon the tracked usage indicating that the first statement has a higher usage than the second statement.

11. The apparatus of claim 8, wherein the program code is configured to selectively optimize the statement further by associating with an optimized representation of the statement a statement signature for an unoptimized representation of the statement, and to access the optimized representation of the statement in response to a user request to access a statement having a statement signature corresponding to the unoptimized representation of the statement.

12. The apparatus of claim 8, wherein the program code is configured to selectively optimize the statement by modifying an unoptimized representation of the statement to perform at least one of instructing the database to convert returned data to a different format prior to returning the data, modifying an access method to be used during execution of the statement, reordering a retrieval order for the data to be returned in response to execution of the statement, and referencing at least one stored procedure.

13. A program product, comprising:
program code configured to be executed by the processor to manage a statement pool utilized by a database by tracking usage of a plurality of statements in the statement pool and selectively optimizing at least one of the statements from the statement pool based upon the tracked usage of the plurality of statements, wherein the program code is further configured to, after selectively optimizing the statement, process a request to access an unoptimized representation of the statement by accessing an optimized representation of the statement, and wherein the program code is further configured to execute a database query on the database using the optimized representation of the statement; and
a non-transitory recordable medium storing the program code.

14. The program product of claim 13, wherein the program code is configured to track usage by tracking at least one of a number of times and a last time that each of the plurality of statements is used.

15. The program product of claim 13, wherein the program code is further configured to selectively optimize a second statement from the statement pool after selectively optimizing a first statement based upon the tracked usage indicating that the first statement has a higher usage than the second statement.

16. The program product of claim 13, wherein the program code is configured to selectively optimize the statement further by associating with an optimized representation of the statement a statement signature for an unoptimized representation of the statement, and to access the optimized representation of the statement in response to a user request to access a statement having a statement signature corresponding to the unoptimized representation of the statement.

17. The program product of claim 13, wherein the program code is configured to selectively optimize the statement by modifying an unoptimized representation of the statement to perform at least one of instructing the database to convert returned data to a different format prior to returning the data, modifying an access method to be used during execution of the statement, reordering a retrieval order for the data to be returned in response to execution of the statement, and referencing at least one stored procedure.

* * * * *